United States Patent

[11] 3,615,588

[72] Inventors Heine, Christian
 Monheim/Rhineland;
 Werner Stein, Erkrath-Unterbach, both of Germany
[21] Appl. No. 741,879
[22] Filed July 2, 1968
[45] Patented Oct. 26, 1971
[73] Assignee Henkel & Cie GmbH
 Dusseldorf-Holthausen, Germany
[32] Priority July 28, 1967
[33] Germany
[31] H 63430

[54] GLYCERIDE MIXTURE AND PLASTIC EDIBLE FATS PREPARED THEREFROM
11 Claims, No Drawings
[52] U.S. Cl. .................................................. 99/118 R,
 99/122 R, 99/123
[51] Int. Cl. .................................................. A23d 5/00
[50] Field of Search ................................. 99/118, 118
 F, 118 H, 122, 123, 122 MO

[56] References Cited
UNITED STATES PATENTS
2,238,441 4/1941 Drew ............................ 99/123 X
3,210,197 10/1965 Galenkamp ................. 99/118 X Primary Examiner—Joseph M. Golian
Attorney—Hammond and Littell ABSTRACT: This invention relates to a glyceride mixture suitable for transformation into a plastic edible fat having a wide plasticity range comprising a mixture of from 93 percent to 100 percent of triglycerides of fatty acids and from 0 to 7 percent of glycerides selected from the group consisting of monoglycerides of fatty acids and diglycerides of fatty acids wherein said glyceride mixture contains from 90 percent to 60 percent of oily glycerides and from 10 percent to 40 percent of hard glycerides where said hard glycerides contain from 10 percent to 75 percent of triglycerides which melt at from 30° C. to 45° C. and which have one unsaturated and two saturated fatty acid moieties per molecule, from 90 percent to 25 percent of glycerides which melt at from 48° C. and 60° C. and which have at least one myristic acid moiety per molecule, and from 0 to 12 percent of glycerides which melt above 60° C. The invention also relates to the process of transforming said glyceride mixture into a plastic edible fat having a wide plasticity range and to the plastic edible fat so produced.

3,615,588

GLYCERIDE MIXTURE AND PLASTIC EDIBLE FATS PREPARED THEREFROM

THE PRIOR ART

By plastic edible fats according to this invention, above all, those fats are meant which are known in the English-speaking countries under the name of "shortenings," which are practically free from water and do not flow at normal room temperatures, as well as water-containing fats such as margarine. Those plastic edible fats free from water consist of a greater amount of an oily triglyceride and a smaller amount of a solid, crystallized triglyceride whereby the plastic properties of the fat are determined to a great degree by the amount, the kind and the state of division of the solid components. Up to the present time, triglycerides have been employed as solid components of plastic edible fats which are derived essentially from the fatty acids palmitic acid and/or stearic acid. The plastic properties of such fats can certainly be changed through varying the amount of solid triglycerides within certain limits. If, however, the plastic range of a fat is increased through increasing the amount of the solid fat then, inevitably, the amount of undesired triglycerides which have their melting point considerably above body temperature is increased and thus the melting point of the entire mixture of glycerides is raised.

OBJECTS OF THE INVENTION

An object of the invention is the obtention of a plastic edible fat having a wide plasticity range.

Another object of the invention is the obtention of a glyceride mixture suitable for transformation into a plastic edible fat having a wide plasticity range comprising a mixture of from 93 percent to 100 percent of triglycerides of fatty acids and from 0 to 7 percent of glycerides selected from the group consisting of monoglycerides of fatty acids and diglycerides of fatty acids wherein said glyceride mixture contains from 90 percent to 60 percent of oily glycerides and from 10 percent to 40 percent of hard glycerides where said hard glycerides contain from 10 percent to 75 percent of triglycerides which melt at from 30° C. to 45° C. and which have one unsaturated and two saturated fatty acid moieties per molecule, from 90 percent to 25 percent of glycerides which melt at from 48° C. and 60° C. and which have at least one myrisitic acid moiety per molecule, and from 0 to 12 percent of glycerides which melt above 60° C.

A further object of the invention is the development of a process for the preparation of the aforesaid glyceride mixture.

A yet further object of the invention is the development of a process for the preparation of a plastic edible fat having a wide plasticity range which comprises melting the aforesaid glyceride mixture, cooling said melt under agitation to a temperature wherein the higher melting components of said glyceride mixture crystallize, annealing said cooled mixture for a time sufficient to convert unstable crystalline components to stable crystalline components and recovering said edible fat.

These and other objects of the invention will become more apparent as the description thereof proceeds.

DESCRIPTION OF THE INVENTION

The invention relates to a glyceride mixture suited as edible fat which does not have the disadvantages of the known glyceride mixtures. The glyceride mixtures of the invention consist of an oily glyceride and an amount of hard fat whereby the amount of hard fat comprises generally 10 percent to 40 percent, preferably 15 percent to 35 percent by weight of the glyceride mixture. The amount of hard fat is characterized in that it consists of 10 percent to 75 percent, preferably 20 percent to 70 percent by weight of triglycerides with one unsaturated and two saturated moieties of fatty acid in the molecule and which melt at 30° to 45° C., preferably at 35° to 38° C. and of 90 percent to 25 percent, preferably 80 percent to 30 percent by weight of glycerides melting in the range of from 48° to 60° C. and containing at least one myristic acid moiety in the molecule and possibly the moieties of lauric acid, palmitic acid and/or stearic acid in the molecule and where glycerides which may be present and which melt at temperatures over 60° constitutes at the most 12 percent and preferably 9 percent by weight of the total amount of hard fat.

The glyceride mixture of the invention is therefore a glyceride mixture suitable for transformation into a plastic edible fat having a wide plasticity range comprising a mixture of from 93 percent to 100 percent of triglycerides of fatty acids, and from 0 to 7 percent of glycerides selected from the group consisting of monoglycerides of fatty acids and diglycerides of fatty acids wherein said glyceride mixture contains from 90 percent to 60 percent of oily glycerides and from 10 percent to 40 percent of hard glycerides where said hard glycerides contain from 10 percent to 75 percent of triglycerides which melt at from 30° C. to 45° C., and which have one unsaturated and two saturated fatty acids moieties per molecule, from 90 percent to 25 percent of glycerides which melt at from 48° C. to 60° C. and which have at least one myristic acid moiety per molecule, and from 0 to 12 percent of glycerides which melt above 60° C.

Furthermore, the invention relates to plastic edible fats of the above composition in which those glycerides melting at higher temperatures are present in their more stable crystalline modifications. These edible fats can be practically free from water, but can contain water as well as, for instance, in the case of margarines prepared therefrom.

The melting points of glycerides described above are to be understood to be those of the most stable modifications of the glycerides. Generally, glycerides, particularly triglycerides, occur in three crystalline modifications, an unstable one, referred to as the $\alpha$-modification, a more stable one usually referred to as the $\beta'$-modification and a most stable one usually referred to as the $\beta$-modification. However, not all experts utilize this nomenclature. For the purposes of the invention, the $\beta$-modification and the $\beta'$-modification are to be regarded as the more stable crystalline forms, and the plastic edible fats of the invention should contain the hard fat components in one of these two crystalline modifications.

In the case of those above-mentioned liquid (oily) and solid glyceride constituents of the glyceride mixture, they are preferably triglycerides of fatty acids. However, it is possible that the edible fats of the invention contain monoglycerides and/or diglycerides of fatty acids to give an improvement of their properties, especially if they are to be used as baking fats. These partial glycerides can be prepared in the individual fat components through an interchange of ester radicals with added glycerine, or primarily in the case of monoglycerides, these can be added to the triglyceride. The amount of these partial glycerides can constitute up to 7 percent of the weight of the total glyceride mixture, but preferably is, at the highest, 5 percent. Often good results are obtained with the addition of partial glycerides in amounts of from 2 percent to 4 percent by weight of the glyceride mixture. These partial glycerides can be present as a constituent of the liquid and/or as a constituent of any component of the hard fat. Preferably they form a constituent of those higher or highest melting components of the hard fat.

To obtain the glyceride mixture of the invention, preferably a mixture is made of naturally occurring oils and fats or isolated glycerides therefrom. The naturally occurring oils or fats utilized ordinarily consist of mixtures of glycerides of fatty acids.

As the liquid glyceride component, above all fats consisting of triolein are under consideration. By "olein" we refer not only to oleic acid triglycerides but also to every triglyceride mixture of naturally occurring unsaturated fatty acids. Above all, triglycerides of mixtures of oleic acid and linoleic acid fall into this category. A content of linoleic acid as a glyceride in the edible fats of the invention is very desirable for nutritive physiologically reasons. Suited for the source of the oily or liquid component of the glyceride mixture of the invention are, for instance, rape oil, cottonseed oil, peanut oil, sunflower oil, corn oil, sesame oil, soybean oil, and safflower oil. Fish oils are also suitable, however, preference is given to oils of a vegetable origin. In the case of fish oils, a selective hydrogenation may be desired in order to eliminate the fishy taste without reducing the amount of unsaturated glycerides present therein noticeably. Also higher unsaturated vegetable oils can be hydrogenated partially in order to reduce partially the content of linoleic acid in the glyceride or to eliminate it. Triglycerides occurring, or dissolved in the liquid glycerides, which possess two unsaturated and one saturated fatty moiety are to be considered liquid glycerides. The iodine number of the oily component of the glyceride mixture of the invention should, however, not be under 80 and is preferably 100 or over. By iodine number is meant, in this particular case, the iodine number of the oily component added to the glyceride mixture which oily component in accordance with the above definition can already contain certain amounts of hard fat components on the basis of its natural composition or due to a previous hydrogenation.

To those glycerides with one unsaturated and two saturated fatty acid moieties per molecule present in the hard fat and melting in the temperature range of between 30° to 45°, preferably between 35° to 38° C., belong such triglycerides as oleodistearin, oleodipalmitin and oleopalmitostearin. These triglycerides are present in several natural fats, for instance, in palm oil, or in cocoa butter. In addition to these, the seed oils expressed from seeds of Allenblackia floribunda and Garcinia indica contain considerable amounts of oleodistearin and lesser amounts of oleopalmitostearin. Therefore, these fats can also be employed for the preparation of the glyceride mixtures of the invention. If the content of triglycerides with higher melting points in the said fats should be undesired, then they can be separated in the usual way.

To those glycerides of the glyceride mixture of the invention present in the hard fat and containing myristic acid, the trimyristin belongs as well. Trimyristin occurs less frequently in natural fats than does the first hard fatty constituent of the glyceride mixture of the invention. Therefore, synthetically prepared trimyristin is often employed, in particular, when the myristic acid was obtained from vegetable fat. However, there are a few fats with a particularly high content of glycerides containing myristic acid or trimyristin and those can be employed directly for the preparation of glyceride mixtures of the composition of the invention.

To these natural fats belong the seed fats from the seeds of the myristicaceen, especially those seed fats from Myristica malabarica, Myristica iriya, Virola surinamensis, Virola zuelensis and Pycnantus kombo. This latter fat contains in its glyceride, in addition to myristic acid, certain amounts of an unsaturated $C_{14}$ acid. Therefore, the output of trimyristic can be increased still further by hydrogenation of the seed fat. Also, the so-called "Dikafette" obtained from Irvingia barteri, Irvingia oliveri or Irvingia gabonensis contain in their glycerides, large amounts of myristic acid. However, the myristic acid is not present in all of these fats as trimyristin and, therefore, it is useful to prepare trimyristin from these fats, if necessary, after previous separation of glycerides of possibly present higher fatty acids by means of a programmed ester interchange.

Trimyristin can be substituted completely or partially with mixed glycerides which, in addition to myristic acid, contain the acid moieties of lauric acid, palmitic acid and stearic acid and which mixed glycerides melt in the range of between 48° to 60° C., preferably between 52° to 57° C.

Such mixed triglycerides are mostly present in natural fats which are rich in myristic acid. However, they can be prepared as well through esterification or ester interchange. Plastic fats of the composition of the invention even possess a better range of plasticity when they contain such mixed triglycerides having at least one myristic acid moiety in the molecule.

For the preparation of the plastic edible fat of the invention the starting components are admixed in the desired quantitative ratio whereby, from the beginning, either starting components are employed which are already refined or nonrefined starting components are used and, subsequently, free fatty acids, undesirable taste, odor and/or coloring components are eliminated from the mixture in the normal way.

Such a glyceride mixture already fulfills all requirements on the basis of its triglyceride composition for the preparation of a plastic fat with the above-named advantageous properties. Therefore, the glyceride mixture itself represents a product of the invention without requiring the special further preparation to give the edible plastic fat of the invention. This glyceride mixture, for instance, can be marketed for the subsequent treatment to give the plastic edible fat of the invention.

If the glyceride mixture thus composed is to be transferred into a plastic fat practically free from water, it is first melted, then cooled down under constant stirring at a temperature at which those fat components of the mixture which melt at higher temperatures separate in a crystalline manner. Suitable is a scraper-cooler in which the melted glyceride mixture is conducted in tubes which are cooled from the outside during which time the inner walls of the tubes are kept clear of deposits of solid fat crystals. If so desired inert gases, such as nitrogen or carbon dioxide, can be introduced into the scraper-cooler and dispersed in the fat during this procedure. Such introduction of inert gases increases further the plasticity and stability of the plastic edible fat produced. The amount or inert gas can, if utilized, amount to 10 to 120 ml. of gas per 100 g. of fat and, preferably, 30 to 50 ml. of gas per 100 g. of fat.

Those crystals of fat produced during the cooling process are still in the unstable crystal modification. On annealing, they are formed into the more stable modifications. Toward this end, the cooled fat is heated to a temperature which lies slightly below the melting point of the unstable crystal modification and then the fat is kept for some time, approximately 1/2 to 3 days, at this temperature. The unstable crystal modification then reverts into a more stable one and the desired edible plastic fat is obtained which even on long storage times does not change its consistency substantially.

The plastic edible fats of the invention are of special practical value for the reason that in comparison to other known edible fats, the amount of glycerides melting at temperatures above 60° C. is very small. Therefore, the dropping point of the plastic edible fats of the invention is not above 45° C. In addition, and surprising in view of the low dropping point, they do not show any separation of oil during a storage time of 24 hours.

If a margarine is to be prepared from the glyceride mixture, which is prepared by the invention, the mixture is first emulgated with water in a known way and with the use of common emulgators.

The following examples are illustrative of the practice of the invention. However, they are not to be deemed limitative in any respect.

EXAMPLES

The trimyristin employed in the examples was prepared by means of esterification of myristic acid with glycerine. The myristic acid-stearic acid-mixed glyceride was prepared by means of esterification of a mixture of 2 mols of myristic acid and 1 mol of stearic acid with 1 mol of glycerine. This mixed glyceride had the following composition.

|  | Weight percent |
| --- | --- |
| Trimyristin | 30.1 |
| Stearodimyristin | 44.5 |
| Myristodistearin | 21.8 |
| Tristearin | 3.6 |

The crude esterification products and the other starting materials employed for the preparation of the mixed glycerides of the invention were refined by the alkaline method in a known way and were subsequently dried and deaerated.

The mixtures were completely melted down. Although these mixtures exhibit already the composition of the invention, the advantageous plastic properties can only be demonstrated on the plastic edible fat. For that reason the mixed glycerides were prepared further to a plastic fat.

For this purpose a semitechnical procedure was utilized. A scraping cooler commonly used in the edible fat industry was utilized. This was a tube cooled from the outside, the inner wall of which is kept free from deposits of solid fats by means of rotating scrapers. The melted fat mixture entered the scraping cooler at a temperature of 45° to 50° C. and emerged at a temperature of approximately 12° to 16° C. Nitrogen was introduced into the scraping cooler under pressure and was dispersed in the fat in the form of fine gas bubbles. The gas-containing fat thus obtained was annealed for 48 hours at 30° C.

In order to prepare smaller amounts of gas-containing plastic edible fats in the laboratory, the warm starting mixture was stirred in an ordinary mixing apparatus and at the same time solid carbon dioxide was introduced into it, whereupon the fat cooled down and simultaneously the carbon dioxide diffused into the plastic fat. The fat cooled down to 10° C. and was then annealed in the above-described way.

The plasticity of the plastic edible fat was measured with a penetrometer of the firm, E. Schildknecht, Zurich Switzerland, employing "microfatkontus", a rod of 5.5 mm. which is tapered conically.

EXAMPLE 1

The fat specified in this example was prepared in a semitechnical apparatus at an amount of 25 kg. As starting materials were used:

|  | Weight percent |
| --- | --- |
| Trimyristin | 10.0 |
| Palm oil | 18.0 |
| Cotton seed oil | 72.0 |

This mixture had the following composition of glycerides:

|  | Weight percent |
| --- | --- |
| Oily components | 69.8 |
| Hard fat, consisting of: | |
| (Weight percent based on total amount of hard fat) | |
| Trimyristin | 33.2 |
| Oleodistearin, oleodipalmitin and oleopalmitostearin | 62.7 |
| Glycerides with melting points above 60° C. | 4.1 |

The fat contained 31 ml. nitrogen per 100 g. The dropping point was 41° C. After 24 hours of storage at 30° C. no oil separated. At 0° C. the penetration was 2.2 mm. and at 30° C., it was 3.8 mm. This shows that within this temperature range, the penetration increased only 1.6 mm.

EXAMPLE 2

The fat described in this example was prepared in a laboratory at an amount of 100 g.

As starting materials were used:

|  | Weight percent |
| --- | --- |
| Trimyristin | 10 |
| Palm oil | 27 |
| Sunflower oil | 63 |

This mixture had the following composition of glycerides:

|  | Weight percent |
| --- | --- |
| Oily components | 75.9 |
| Hard fat, consisting of: | 24.1 |
| (Weight percent based on total amount of hard fat) | |
| Trimyristin | 41.5 |
| Oleodistearin, oleopalmitin and oleopalmitrostearin | 50.6 |
| Glycerides with melting points above 60° C. | 7.9 |

The $CO_2$ content of the fat was 46 ml. per 100 g. The dropping point was 41° C. After 24 hours of storage at 30° C., no oil separated. At 0° C. the penetration was 2.5 mm. At 30° C., it was 4.7 mm. This shows that within this temperature range the penetration increased only 2.2 mm.

EXAMPLE 3

Similarly as described in example 2, a fat was prepared from:

|  | Weight percent |
| --- | --- |
| Trimyristin | 10.0 |
| Palm oil | 22.5 |
| Sunflower oil | 67.5 |

This mixture had the following composition of glycerides:

|  | Weight percent |
| --- | --- |
| Oily components | 78.3 |
| Hard fat, consisting of: | 21.7 |
| (Weight percent based on total amount of hard fat) | |
| Trimyristin | 46.1 |
| Oleodistearin, oleodipalmitin and oleopalmitostearin | 46.5 |
| Glycerides with melting points above 60° C. | 7.4 |

The gas content of the fat amount to 30 ml. per 100 g. The dropping point was 41° C. After storage of 24 hours at 30° C., no oil separated. At 0° C., the penetration was 3.0 mm. At 30° C., it was 5.7 mm. This shows that within this temperature range, the penetration increased only 2.7 mm.

EXAMPLE 4

Similarly as described in Example 2, a fat was prepared from:

|  | Weight percent |
| --- | --- |
| Myristic acid-stearic acid-mixed triglyceride | 10.0 |
| Palm oil | 18.0 |
| Sunflower oil | 72.0 |

This fat had the following composition of glycerides:

|  | Weight percent |
| --- | --- |
| Oily components | 80.6 |
| Hard fat, consisting of: | 19.4 |
| (Weight percent based on total amount of hard fat) | |
| Trimyristin, stearodimyristin, and myristodistearin | 49.8 |
| Oleodistearin, oleodipalmitin and oleopalmitostearin | 41.8 |
| Glycerides with melting points above 60° C. | 8.4 |

The gas content of the fat amounted to 41 ml. per 100 g. The dropping point was at 36.8° C. After 24 hours of storage at 30° C., no separation of the oil was observed. At 0° C., the penetration was 2.4 mm. At 30° C., it was 3.4 mm. This shows that within this temperature range, the penetration increased only 1.0 mm.

The preceding specific embodiments are illustrative of the practice of the invention. It is to be understood, however, that other expedients known to those skilled in the art may be employed without departing from the spirit of the invention or the scope of the appended claims.

We claim:

1. A glyceride mixture suitable for transformation into a plastic edible fat having a wide plasticity range consisting essentially of a glyceride mixture of from 93 percent to 100 percent by weight of triglycerides of fatty acids and from 0 to 7 percent by weight of glycerides selected from the group consisting of monoglycerides of fatty acids and diglycerides of fatty acids wherein the total amount of said glyceride mixture contains (A) from 90 percent to 60 percent by weight of oily glycerides having an iodine number of greater than 80 and (B) from 10 percent to 40 percent by weight of hard glycerides, the total amount of said hard glycerides consists of (1) from 10 percent to 75 percent by weight of said hard glycerides of triglycerides which melt at from 30° C. to 45° C. and which have one unsaturated and two saturated fatty acid moieties per molecule, (2) from 90 percent to 25 percent by weight of said hard glycerides of glycerides which melt at from 48° C. to 60° C. and which have at least one myristic acid moiety per molecule, and (3) from 0 to 12 percent by weight of said hard glycerides of glycerides which melt above 60° C.

2. The glyceride mixture of claim 1 wherein said glycerides mixture contains from 85 percent to 65 percent of oily glycerides and from 15 percent to 35 percent of hard glycerides.

3. The glyceride mixture of claim 1 wherein said total amount of said hard glycerides contain (1) from 20 percent to 70 percent by weight of said hard glycerides of triglycerides which melt at from 35° C. to 38° C. selected from the group consisting of oleodipalmitin, oleopalmitostearin, oleodistearin and mixtures thereof as said triglyceride component having one unsaturated and two saturated fatty acid moieties per molecule.

4. The glyceride mixture of claim 1 wherein said hard glycerides which melt at from 48° C. to 60° C. and which have at least one myristic acid moiety per molecule are present in said hard glycerides in an amount of from 80 percent to 30 percent and are selected from the group consisting of trimyristin and mixed triglycerides having at least one myristic acid moiety in the molecule and fatty acid moieties in the molecule selected from the group consisting of lauric acid, palmitic acid and stearic acid.

5. The glyceride mixture of claim 1 wherein said hard glycerides contain from 0 to 9 percent of glycerides which melt above 60° C.

6. The glyceride mixture of claim 1 wherein said glyceride mixture consists of 95 percent to 100 percent by weight of triglycerides and of 0 to 5 percent by weight of glycerides selected from the group consisting of monoglycerides and diglycerides.

7. The glyceride mixture of claim 6 wherein said glyceride mixture is a mixture of from 96 percent to 98 percent of triglycerides of fatty acids and from 2 percent to 4 percent of monoglycerides of fatty acids.

8. A plastic edible fat having a wide plasticity range consisting essentially of a glyceride mixture of from 93 percent to 100 percent by weight of triglycerides of fatty acids and from 0 to 7 percent by weight of glycerides selected from the group consisting of monoglycerides of fatty acids and diglycerides of fatty acids wherein the total amount of said glyceride mixture contains (A) from 90 percent to 60 percent by weight of oily glycerides having an iodine number of greater than 80 and (B) from 10 percent to 40 percent by weight of hard glycerides, the total amount of said hard glycerides consists of (1) from 10 percent to 75 percent by weight of said hard glycerides of triglycerides which melt at from 30° C. to 45° C. and which have one unsaturated and two saturated fatty acid moieties per molecule, (2) from 90 percent to 25 percent by weight of said hard glycerides of glycerides which melt at from 48° C. to 60° C. and which have at least one myristic acid moiety per molecule, and (3) from 0 to 12 percent by weight of said hard glycerides of glycerides which melt above 60° C., wherein said hard glycerides are present in the form of finely divided dispersed crystals, which crystals are present in other than their least stable crystalline modifications.

9. The plastic edible fat of claim 8 wherein from 10 ml. to 100 ml. of an inert gas in finely dispersed form is present per 100 gm. of said fat.

10. The plastic edible fat of claim 9 wherein said inert gas is present in an amount of from 30 ml. to 50 ml. per 100 gm. of said fat.

11. The process of producing the plastic edible fat of claim 8 which comprises admixing, at a temperature above the melting point of the components, a glyceride mixture consisting essentially of from 93 percent to 100 percent by weight of triglycerides of fatty acids and from 0 to 7 percent by weight of glycerides selected from the group consisting of monoglycerides of fatty acids and diglycerides of fatty acids wherein the total amount of said glyceride mixture contains (A) from 90 percent to 60 percent by weight of oily glycerides having an iodine number of greater than 80 and (B) from 10 percent to 40 percent by weight of hard glycerides, the total amount of said hard glycerides consists of (1) from 10 percent to 75 percent by weight of said hard glycerides of triglycerides which melt at from 30 ° C. to 45° C. and which have one unsaturated and two saturated fatty acid moieties per molecule, (2) from 90 percent to 25 percent by weight of said hard glycerides of glycerides which melt at from 48° C. to 60° C. and which have at least one myristic acid moiety per molecule, and (3) from 0 to 12 percent by weight of said hard glycerides of glycerides which melt above 60° C., whereby a liquid glyceride mixture is formed, cooling said liquid glyceride mixture under mechanical agitation and introducing from 10 ml. to 120 ml. of a finely dispersed inert gas per 100 gm. of said liquid glyceride mixture to attain to a temperature whereby said hard glycerides of said glyceride mixture crystallize and said crystals of said hard glycerides present in the cooled glyceride mixture are present in a finely dispersed form, subjecting said cooled glyceride mixture to a temperature above the melting point of the least stable crystalline modification of said crystals of said hard glycerine for a time sufficient to convert said crystals of said hard glycerine to other than their least stable crystalline modifications and recovering said plastic edible fat having a wide plasticity range.